Jan. 12, 1926.                                           1,569,502
                         A. KURTIS
             AUTOMATIC BRAKING DEVICE FOR VEHICLES
                 Filed Feb. 12, 1925      3 Sheets-Sheet 3

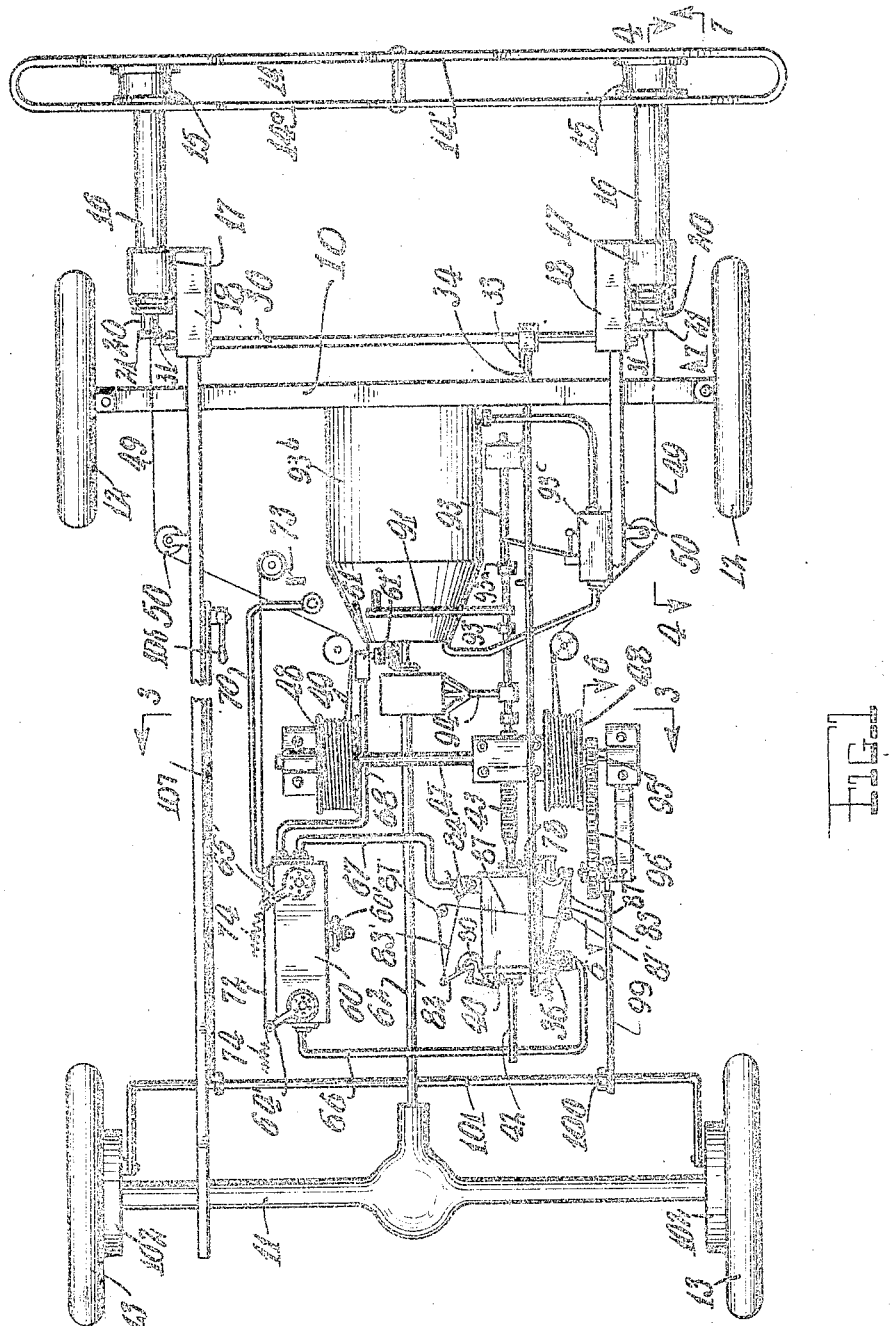

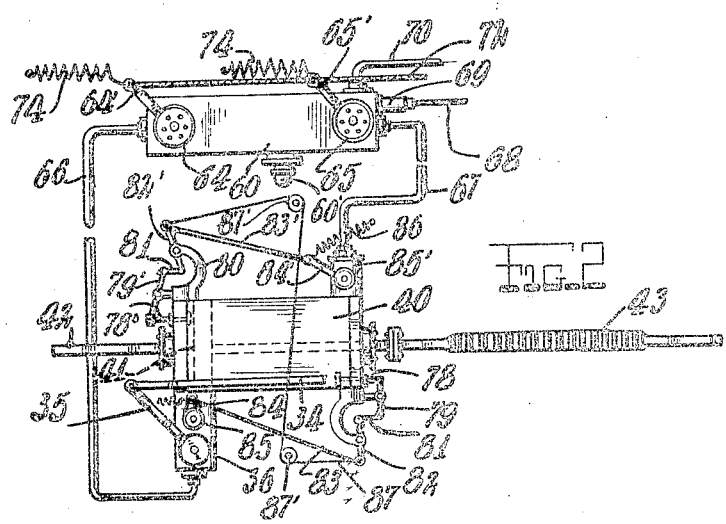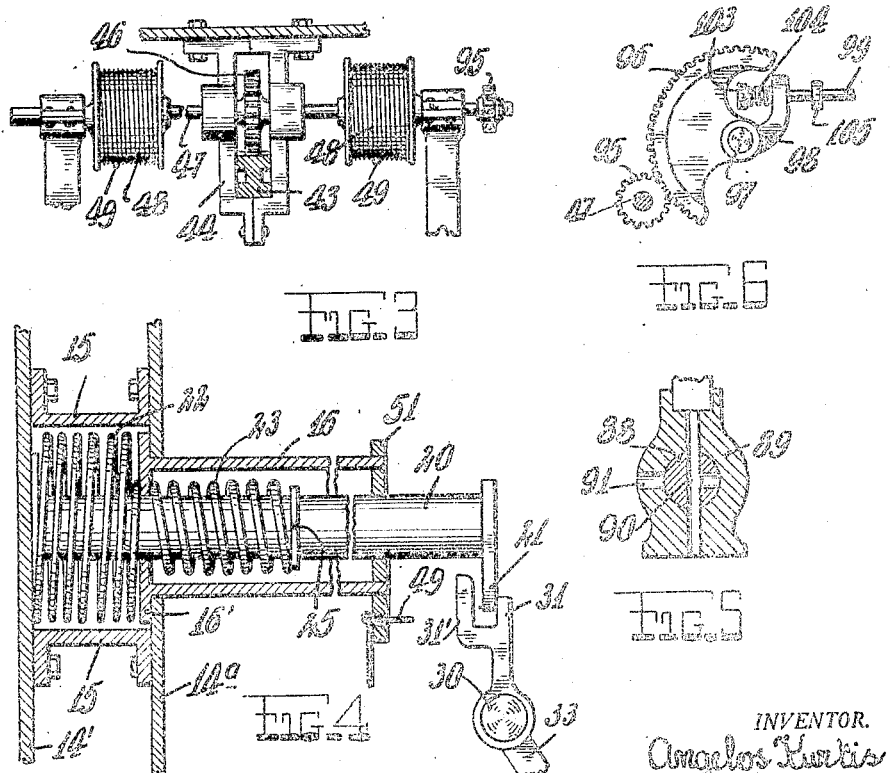

INVENTOR.
Angelos Kurtis
BY
ATTORNEYS.

Patented Jan. 12, 1926.

1,569,502

UNITED STATES PATENT OFFICE.

ANGELOS KURTIS, OF BROOKLYN, NEW YORK.

AUTOMATIC BRAKING DEVICE FOR VEHICLES.

Application filed February 12, 1925. Serial No. 8,642.

*To all whom it may concern:*

Be it known that I, ANGELOS KURTIS, a citizen of the United States, residing at Brooklyn, in the county of Kings and State of New York, have invented certain new and useful Improvements in Automatic Braking Devices for Vehicles, of which the following is a specification.

This invention relates to a bumper-operated clutch and brake mechanism for trucks and street cars by means of which the brake is set, the clutch disengaged, and the transmission thrown into neutral position when the bumper or fender of the vehicle is struck.

The present invention is a further development of one disclosed in the previous patent granted to me on July 22, 1924, No. 1,502,145, and it has for an object to improve the operating means there disclosed, by causing the operation of the mechanism by compressed air, instead of by springs as in the said former patent.

A further specific object of the invention is to provide a slidable bar that operates the various parts and is connected to the piston of an air cylinder to be moved thereby, another object being to relieve the driver of the need of setting the device by compressing the springs as in my former patent.

For further comprehension of the invention, and for the objects and advantages thereof, reference will be had to the following description and accompanying drawing, and to the appended claims in which the various novel features of the invention are more particularly set forth.

Fig. 1 of the drawing is a plan view showing an automobile chassis having the invention applied thereto.

Fig. 2 is a detail longitudinal sectional view, with certain parts in elevation, showing the air cylinder and associated parts.

Fig. 3 is a detail transverse sectional view taken on the line 3—3 of Fig. 1.

Fig. 4 is a detail side elevational view on the line 4—4 of Figure 1, showing the brake operating means.

Fig. 5 is a detail transverse sectional view of one of the valves controlling the passage of air to and from the cylinder.

Fig. 6 is a fragmentary longitudinal sectional view taken on the line 6—6 of Fig. 1.

Figure 7:
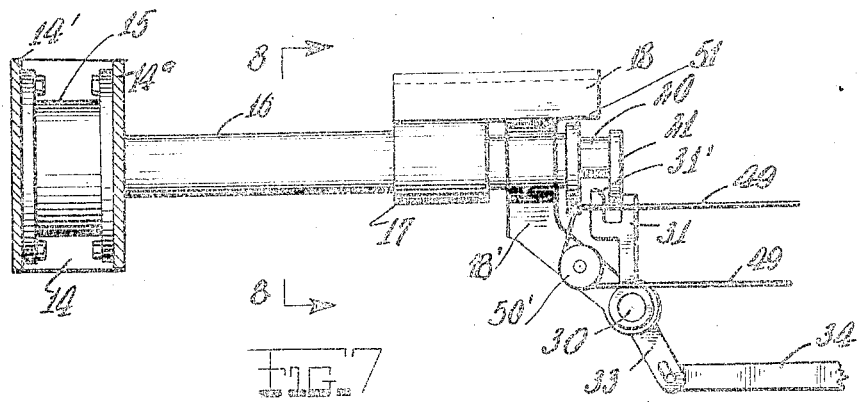
Fig. 7 is a detail side elevation view taken on the line 7—7 of Fig. 1.
Figure 8:
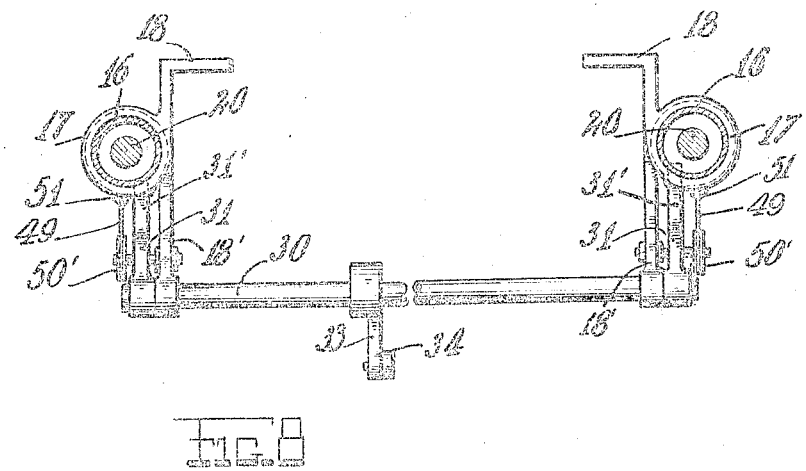
Fig. 8 is a detail transverse sectional view taken on the line 8—8 of Fig. 7.

In the drawing the reference numeral 10 indicates the front axle of an automobile, and 11 the rear axle, the front wheels being shown at 12 and the rear wheels at 13. The bumper is shown at 14 and comprises a pair of spaced parallel bars 14' and 14ª connected to one another at points along their length as at 15 and arranged one in front of the other. The bumper is mounted on the forward ends of a pair of tubular members 16 that are slidable in suitable bearings 17 adapted for fixing on the usual side frame members of the automobile by their upper inverted L-shape extensions 18. Fixed at their forward ends to to the front bar of the bumper are plunger rods 20 that extend rearwardly through the members 16 and have offsets 21 on their rear ends. Surrounding each of the rods 20 are the coiled compression springs 22 and 23 the former of which bears between the front bumper bar 14' and the flanged forward end 16' of the adjacent member 16, while the latter bear between the said forward end and a collar 25 fixed on the rod. The flange 16' on the end of the member 16 retains the bumper against displacement therefrom, this flange being positioned in front of the rear bumper bar 14ª, the latter having an opening therein through which the said member projects.

Extending transversely of the automobile, just to the rear of the members 23, is a transverse rock shaft 30 which is rotatably mounted in depending frames 18' and on which is fixed behind each of said members an upwardly projecting arm 31 that normally projects behind the offset 21, this arm having a longer forked projection 31' that engages in front of the said offset. The shaft 30 has also fixed thereon a depending arm 33 to which is attached one end of a rod or link 34 that extends rearwardly and is attached at its rear end to the operating handle 35 of a valve 36 on the cylinder through which the various parts are operated.

This cylinder is shown at 40 and is mounted adjacent the rear end of the automobile and suitably supported on the chassis. In this cylinder is a piston 41 to which is attached a piston rod 42 that projects from the cylinder and has a rack bar 43 attached thereto, in alinement therewith, this rack bar being guided in a bracket 44 on the chassis. The rack bar 43 engages a gear pinion 46 fixed on a transverse shaft 47 supported by the said bracket 44 and having a pair of spirally grooved drums or pulleys 48 thereon. To these drums 48 are attached the rear ends of the ropes that extend forwardly around horizontal and vertical guide pulleys, 50, 50' and connect to the collars 51 on the rear ends of the tubular plunger members 16 before referred to, so that when the drums are caused to rotate in one direction the bumper member is drawn backward and when the drums are caused to rotate in the opposite direction the bumper member is drawn forward.

For supply of air to the cylinder 40 I provide a tank 60 suitably mounted on the chassis, and which may be supplied with compressed air from a pump indicated at 61, and connected to the main drive shaft 62 of the automobile to be operated thereby and controlled by the driver who allows a sufficient supply of air to fill tank 60 and then disconnects clutch 61' when a pressure gauge indicates a full supply in tank 60. Or the tank may be supplied in any suitable manner. The tank is provided with a safety valve 60' and a pair of outlet ports controlled by valves 64 and 65 from which pipes 66 and 67 lead to opposite ends of the cylinder 40, a supply pipe 68 leading from the pump to the tank, this pipe preferably having therein a one way valve 69. An air pressure gauge may be supplied on the dashboard of the automobile and connected with a pipe 70 leading from the tank 60. The valves 64 and 65 on the tank are provided with operating handles 64' and 65' to which a cable 72 is attached, this cable being connected to a handle 73 to be moved thereby to close the valves, tension springs 74 each attached at one end to the respective valve handles and at their other ends to the chassis acting to retain the valves normally open.

Slidably mounted in suitable bearing elements in opposite ends of the cylinder 40 are the plunger rods 78, 78' whose outer ends are connected to the respective rock levers 79, 79' fulcrumed between their ends on brackets 80 projecting from the cylinder, these levers being connected also, by the short links 81 to other rock levers 82, 82' also fulcrumed between their ends to the said brackets 80. Connected to these levers are the links 83, 83' which connect also to the handles 84, 84' of the control valves 85, 85'. The handle 84' has connected thereto a tension spring 86. The levers 82 and 82' are connected by a flexible cord 87 which pass over suitable pulleys 87'. Each valve comprises a plug 88 in a suitable casing 89, and having a T-shaped port 90 extending transversely therethrough which may be made to register, by rotation of the plug either with the feed pipe, or an exhaust port 91.

Connected to the opposite end of the rack bar 43, before mentioned, to that to which the piston rod 42 is attached, is another alined rod or bar 93 which has rigid finger 94 projected therefrom and arranged to shift the transmission and clutch as above set forth, and is also provided with collars 93 and 93ᵃ arranged to control the gas supply from tank 93ᵇ and the ignition switches in casing 63ᶜ respectively, this feature of the device being described in my above mentioned patent. To operate the brake I provide the following means: Fixed to the shaft 47 on which the drums are mounted a gear pinion 95 that meshes with a segmental gear 96 on a stub shaft 97. The shaft 97 has fixed thereto an arm 98 through which is an opening or eye that receives one end of a rod 99 which extends rearwardly to connect to an arm 100 on the shaft 101 that operates the brakes 102. The rod 99 may have a head 103 on its forward end, which a compression or cushion spring 104 preferably surrounds the rod between the said head and the arm 98, a collar 105 on the rod limiting relative movement of the latter with respect to the arm 98. I also provide usual hand operating lever 106 which actuates shaft 101 thru a connecting link 107.

In the operation of my improved device when the bumper is struck by some object the plunger rods 20 are moved backward and their offsets 21 bear on the forked arm 31 causing the shaft 30 to be rocked and the rod 34 to be pulled. Valve 36 being thereby opened, the air enters the cylinder 40 and causes the piston 41 to move to the opposite end thereof, imparting movement to the rack bar 43, with a consequent winding of the cords 49 on the drums 48 draw the whole fender or bumper backward. At the same time the clutch, brake, and transmission elements are manipulated as above set forth. When the piston reaches the other end of its travel it bears on the plunger rod 78, moving the valve 85 to shut off the air supply and open the exhaust port. When the device is being reset the cable 72 is pulled by the driver means of handle 73 thus successively closing the valve 64 and opening the valve 65. The air from the tank now enters the other end of the cylinder thru pipe 67 and the piston is caused to move forward returning the bumper, clutch, brake, transmission and ignition switch to their former positions.

When the plunger rods 20 move forward their offsets 21 engage the arm elements and thereby cause the rod 34 to be moved to close the valve 36. Simultaneously the movement of the plunger rod 78' closes valve 85, thru levers 79' and 82' and links 81 and 83', at the same time returns plunger rod 78 to normal position thru the connecting cord 87, ready for the next operation.

Having thus described my invention, what I claim as new and desire to protect by Letters Patent of the United States is as follows:—

1. In a vehicle, a movable bumper bar, a brake, a clutch, and transmission control elements, a cylinder, means for supplying compressed air to said cylinder, a piston in said cylinder, a piston rod connected to said piston, elements on said piston rods whereby the above mentioned parts are operated, and means connected to the said bumper bar for controlling admission of air to one end of the said cylinder.

2. In a vehicle, a movable bumper bar, a brake, a clutch, and transmission control elements, a cylinder, means for supplying compressed air to said cylinder, a piston in said cylinder, a piston rod connected to said piston, elements on said piston rods whereby the above mentioned parts are operated and means connected to the said bumper bar for controlling admission of air to one end of the said cylinder, said means comprising a plunger rod connected to the bumper bar, a rock shaft with which said rod is operatively engaged, a valve controlling the admission of air to the said cylinder, and an operative connection between the said rock shaft and valve.

3. In a vehicle, a movable bumper bar, a brake, a clutch and transmission control elements, a cylinder, means for supplying compressed air to said cylinder, a piston in said cylinder, a piston rod connected to said piston, elements on said piston rods whereby the above mentioned parts are operated, and means connected to the said bumper bar for controlling admission of air to one end of the said cylinder, said means comprising a plunger rod connected to the bumper bar, a rock shaft with which said rod is operatively engaged, a valve controlling the admission of air to the said cylinder, and an operative connection between the said rock shaft and valve, and a plunger rod mounted in the end of said cylinder and adapted to be engaged by the said piston to shut off the air supply thereto, when the piston reaches the end of its stroke.

4. In an automobile, a movable bumper bar, springs engaged behind said bar to cushion the same, a pair of plunger rods extending rearwardly from the said bumper, a cylinder means for supplying compressed air to said cylinder, a valve for controlling the admission of air to the said cylinder, operative connections between said plunger rods and the said valve whereby the latter is caused to open upon movement being imparted to the said bumper, a piston in said cylinder, a piston rod connected to the said cylinder and formed with rack teeth, a gear pinion engaged with said rack teeth, a shaft on which said gear pinion is mounted, a pair of drums on said shaft, and wires connected at opposite ends to the said drums and the said bumper to draw the latter backward.

5. In an automobile, a movable bumper bar, springs engaged behind said bar to cushion the same, a pair of plunger rods extending rearwardly from the said bumper, a cylinder means for supplying compressed air to said cylinder, a valve for controlling the admission of air to the said cylinder, operative connections between said plunger rods and the said valve whereby the latter is caused to open upon movement being imparted to the said bumper, a piston in said cylinder, a piston rod connected to the said cylinder and formed with rack teeth a gear pinion engaged with said rack teeth, a shaft on which said gear pinion is mounted, a pair of drums on said shaft, and wires connected at opposite ends to the said drums and the said bumper to draw the latter backward, said bumper being provided with rearwardly extended tubular elements to which the said wires are attached.

6. In an automobile, a movable bumper bar, a brake, a clutch, and transmission control elements, a cylinder, means for supplying compressed air to said cylinder, a piston in said cylinder, a piston rod connected to said piston, elements on said piston rods whereby the above mentioned parts are operated, and means connected to the said bumper bar for controlling admission of air to one end of the said cylinder, and a manually controllable valve for admitting air to the other end of the cylinder.

7. In an automobile, a movable bumper bar, a brake, a clutch, and transmission control elements, a cylinder, means for supplying compressed air to said cylinder, a piston in said cylinder, a piston rod connected to said piston, elements on said piston rods whereby the above mentioned parts are operated and means connected to the said bumper bar for controlling admission of air to one end of the said cylinder, and a manually controllable valve for admitting air to the other end of the cylinder, and a plunger rod slidable in one end of the cylinder to be engaged by the said piston to close the said valve when the piston reaches one end of the cylinder.

8. In an automobile, a movable bumper bar, a brake, a cylinder, means for supplying compressed air to said cylinder, a piston in said cylinder, a piston rod connected to said piston and formed with rack teeth, a pinion engaged with said teeth, a shaft on which said pinion is fixed, a second pinion fixed on said shaft, a gear segment engaged by said second pinion, an arm element rigid with said gear segment, and a rod attached at one end to said arm and operatively connected with the brake to operate the latter.

9. In an automobile, a movable bumper bar, a brake, a cylinder, means for supplying compressed air to said cylinder, a piston in said cylinder, a piston rod connected to said piston and formed with rack teeth, a pinion engaged with said teeth, a shaft on which said pinion is fixed, a second pinion fixed on said shaft, a gear segment engaged by said second pinion, an arm element rigid with said gear segment, and a rod attached at one end to said arm and operatively connected with the brake to operate the latter, said rod having a resilient yielding connection with the said arm.

In testimony whereof I have affixed my signature.

ANGELOS KURTIS.